No. 897,168. PATENTED AUG. 25, 1908.
H. L. SMITH.
LOCK NUT.
APPLICATION FILED NOV. 22, 1907.
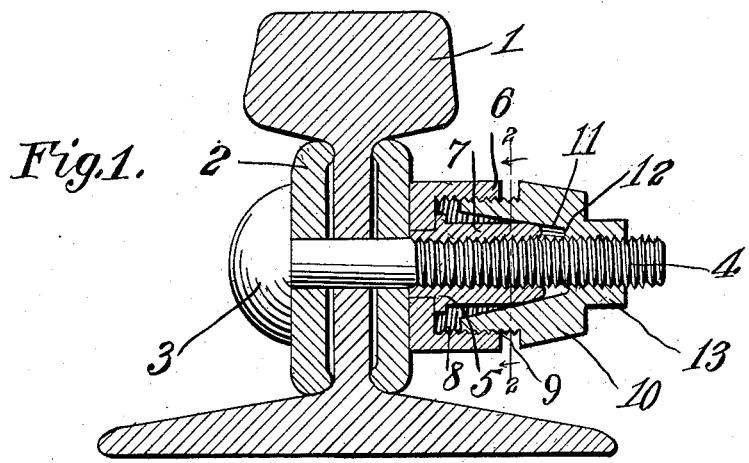
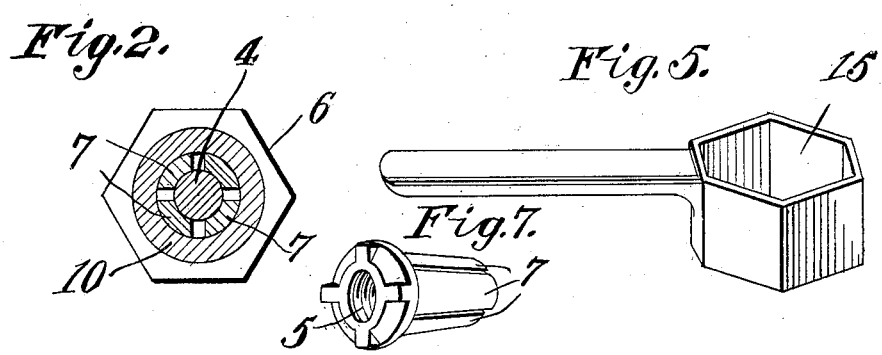
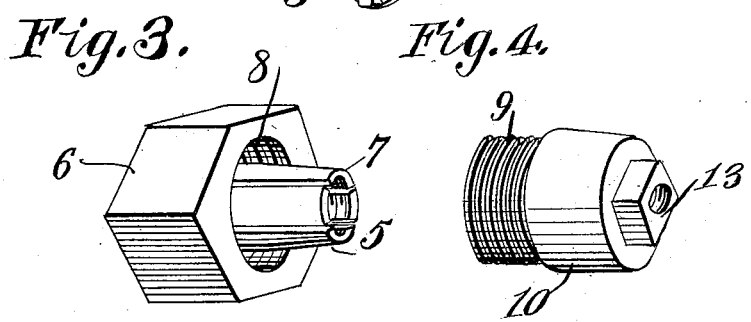
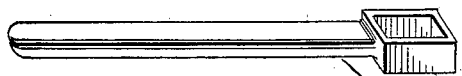
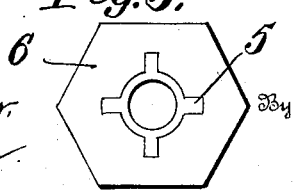
Witnesses
Joe. P. Wahler.
K. Allen.
Inventor
Harry L. Smith.
By Victor J. Evans.
Attorney

UNITED STATES PATENT OFFICE.

HARRY L. SMITH, OF PITTSBURG, PENNSYLVANIA.

LOCK-NUT.

No. 897,168.  Specification of Letters Patent.  Patented Aug. 25, 1908.

Application filed November 22, 1907. Serial No. 403,334.

*To all whom it may concern:*

Be it known that I, HARRY L. SMITH, a citizen of the United States, residing at Pittsburg, in the county of Allegheny and State of Pennsylvania, have invented new and useful Improvements in Lock-Nuts, of which the following is a specification.

This invention relates to nut locks, and the object of the invention is to provide a device of this character which will effectively retain the nut upon a bolt after the elements have been assembled and which also provides means whereby the nut may be readily detached from the bolt.

With these objects in view the invention resides in the novel construction of elements and their assemblage in operative combination as will hereinafter be fully described and claimed.

In the drawing, Figure 1 is a cross sectional view of a railway rail and fish plates, and showing my device in operative position thereon. Fig. 2 is a cross sectional view taken upon the line 2—2 of Fig. 1. Fig. 3 is a perspective view of a nut and thimble employed with my device. Fig. 3ª is a rear elevation of the nut and thimble illustrated in Fig. 3. Fig. 4 is a perspective view of the locking nut. Figs. 5 and 6 are perspective views of wrenches which may be employed in applying or detaching my improved nut lock, and Fig. 7 is a detail perspective view of the thimble detached.

In the drawing the numeral 1 illustrates a railway rail of the ordinary construction and provided with the usual fish plates 2. The rail is shown merely to illustrate the application of my device, as it will be understood that the improved nut lock may be used upon all places where motion and vibration tend to loosen the nuts and bolts, such as bridge and marine construction, axles of vehicles, etc.

In carrying out my invention a bolt 3 of the ordinary construction, having the threaded portion 4 is employed, and mounted upon the threads of the bolt is a thimble 5, immovably secured to a hollow nut 6 and having its projecting portion tapered toward its free end, and this tapering extension slit or sawed to provide a plurality of resilient fingers 7. The nut 6 is screw threaded upon its inner hollow face 8 at a pitch corresponding to and in the same direction of the pitch of the threaded portion 4 of the bolt 3, and is adapted for the reception of the threaded portion 9 of the locking nut 10. The locking nut 10 is provided with an internal cone-shaped recess 11 terminating in a vertical wall 12 and a screw threaded opening is provided for the nut from the wall 12 to its outer free extremity. A wrench hold 13 is provided upon the outer face of the nut 10 adapted for the reception of the wrench 14 when the elements of the locking nut are to be assembled, while the wrench 15 is adapted for engagement with the nut 6 when being applied upon the screw-threaded portion 4 of the bolt 3.

In assembling my locking device upon a bolt the hollow nut 6 carrying the split thimble 7 is rotated upon the bolt, the threads of the split thimble engaging the threads of the bolt. When these members are sufficiently tightened the locking nut or element is applied, the threads within the interior of the element engaging the threads 4 of the bolt, while the threads 9 of the element engage with the threads upon the inner hollow face of the nut 6, and the cone-shaped recessed portion of the locking element bears against the fingers 7 of the split thimble 5, forcing the fingers tightly against the threads of the bolt 4 and securely retaining the device in an immovable position upon the bolt.

Should it be desired to remove the bolt and locking device, the wrench 15 is applied upon the nut 6 to hold it in an immovable position, the wrench 14 applied upon the nut hold 13 of the locking element 10 and the locking element unscrewed from its engagement with the nut 6, the fingers 7 of the thimble 5 are then allowed to spring away from engagement with the threads of the bolt 4 at their ends and the wrench 15 rotated to disengage the thimble 5 from the bolt 4, and the parts thus disassembled.

While I have described the preferred invention of the device minor details of construction may be resorted to without departing from or sacrificing the spirit of the invention.

Having thus fully described the invention what is claimed as new is:

In a nut lock, the combination of a bolt, a hollow nut and a tapering thimble provided with split fingers internally threaded and adapted for engagement with the threads of the bolt, and a locking nut having an outer threaded portion, the threads of said portion being at a pitch corresponding with the threads of the bolt, a cone-shaped recess and an internal threaded portion, the internal threaded portion of the locking nut adapted to engage the threads of the bolt, the outer threaded portion of the locking nut adapted to engage the internal threads of the hollow nut and the walls of the cone-shaped recess of the locking nut adapted to contact with the split fingers of the tapering thimble when the elements are in locked position.

In testimony whereof I affix my signature in presence of two witnesses.

HARRY L. SMITH.

Witnesses:
  JOHN A. FISHER,
  G. C. MCKNIGHT.